(12) United States Patent
Ballester

(10) Patent No.: US 8,733,034 B2
(45) Date of Patent: May 27, 2014

(54) LOADING BAY

(75) Inventor: Miguel Angel-Iglesias Ballester, Barcelona (ES)

(73) Assignee: Amiserru, S.L., Barcelona (ES)

(*) Notice: Subject to any disclaimer, the term of this patent is extended or adjusted under 35 U.S.C. 154(b) by 0 days.

(21) Appl. No.: 13/515,680

(22) PCT Filed: Nov. 29, 2010

(86) PCT No.: PCT/ES2010/070782
§ 371 (c)(1), (2), (4) Date: Aug. 15, 2012

(87) PCT Pub. No.: WO2011/083189
PCT Pub. Date: Jul. 14, 2011

(65) Prior Publication Data
US 2012/0304558 A1 Dec. 6, 2012

(30) Foreign Application Priority Data

Dec. 22, 2009 (ES) .................................. 200931223

(51) Int. Cl.
*E04H 14/00* (2006.01)
(52) U.S. Cl.
USPC ............................. 52/173.2; 52/2.12; 14/71.5
(58) Field of Classification Search
CPC . B65G 69/008; B65G 69/001; B65G 69/2882
USPC .................................. 52/173.2, 2.12; 14/71.5
See application file for complete search history.

(56) References Cited

U.S. PATENT DOCUMENTS

| 2,489,869 | A |   | 11/1949 | Dunn |          |
|-----------|---|---|---------|------|----------|
| 3,216,433 | A | * | 11/1965 | D Azzo | 52/179 |
| 4,682,382 | A | * | 7/1987  | Bennett | 14/71.3 |
| 4,843,373 | A | * | 6/1989  | Trickle et al. | 340/540 |
| 5,109,639 | A | * | 5/1992  | Moore | 52/2.12 |
| 5,440,772 | A | * | 8/1995  | Springer et al. | 14/69.5 |
| 5,457,838 | A | * | 10/1995 | Gelder et al. | 14/69.5 |
| 5,675,945 | A | * | 10/1997 | Giuliani et al. | 52/173.2 |
| 5,953,868 | A | * | 9/1999  | Giuliani et al. | 52/173.2 |
| 6,329,931 | B1* | | 12/2001 | Gunton | 340/933 |
| 6,405,397 | B1* | | 6/2002  | Alexander | 14/71.7 |
| 6,425,214 | B1* | | 7/2002  | Boffeli et al. | 52/173.2 |

(Continued)

FOREIGN PATENT DOCUMENTS

| FR | 2855195 | 11/2004 |
| GB | 1161537 | 8/1969 |
| WO | WO 2010/066915 | 6/2010 |
| WO | WO 2010/112619 | 10/2010 |

*Primary Examiner* — Elizabeth A Plummer
(74) *Attorney, Agent, or Firm* — Leason Ellis LLP

(57) ABSTRACT

This loading bay includes a hinged ramp to form a passage between the warehouse and the container of the truck. The loading bay has a lateral and upper shelter, and a hinged platform that is located at a level below the hinged ramp. The loading bay includes movable frontal stops, assembled on the front end of the platform and that define contact surfaces for the trailer or container of the truck when it is approaching the loading bay. In addition, a position detector is provided for detecting the position of the frontal stops and activates an luminous signal device to issue different luminous messages depending on the movement of the frontal stops. In addition, the loading bay has a device for longitudinally moving the frontal stops away from the container of the truck once it is stationary in the loading bay.

13 Claims, 6 Drawing Sheets

(56) References Cited

U.S. PATENT DOCUMENTS

| | | | |
|---|---|---|---|
| 6,497,076 B1* | 12/2002 | van de Wiel et al. | 52/173.2 |
| 6,634,139 B1* | 10/2003 | Metz | 49/13 |
| 6,654,976 B2* | 12/2003 | Digmann et al. | 14/69.5 |
| 6,832,403 B2* | 12/2004 | Hahn et al. | 14/69.5 |
| 6,883,198 B2* | 4/2005 | Alexander | 14/71.5 |
| 7,274,300 B2* | 9/2007 | Duvernell et al. | 340/686.6 |
| 7,380,375 B2* | 6/2008 | Maly | 52/173.1 |
| 7,533,431 B2* | 5/2009 | Hochstein et al. | 14/69.5 |
| 8,065,770 B2* | 11/2011 | Proffitt et al. | 14/69.5 |
| 8,181,759 B2* | 5/2012 | Schmidt et al. | 188/371 |
| 8,424,254 B2* | 4/2013 | Ballester | 52/173.2 |
| 8,499,393 B2* | 8/2013 | Ballester | 14/71.1 |
| 2002/0124491 A1* | 9/2002 | Hahn et al. | 52/174 |
| 2002/0162179 A1 | 11/2002 | Hahn et al. | |
| 2003/0145535 A1* | 8/2003 | DiBiase et al. | 52/173.2 |
| 2003/0197622 A1* | 10/2003 | Reynard et al. | 340/686.1 |
| 2003/0199996 A1* | 10/2003 | Reynard et al. | 700/17 |
| 2004/0025267 A1* | 2/2004 | Hahn et al. | 14/71.3 |
| 2005/0011020 A1 | 1/2005 | Alexander et al. | |
| 2006/0045678 A1* | 3/2006 | Andersen | 414/401 |
| 2007/0151819 A1* | 7/2007 | Schmidt et al. | 188/377 |
| 2007/0283636 A1* | 12/2007 | Bernacki et al. | 52/173.2 |
| 2008/0034683 A1* | 2/2008 | Hoffmann | 52/173.2 |
| 2008/0095598 A1* | 4/2008 | Cotton et al. | 414/401 |
| 2008/0184503 A1* | 8/2008 | Andersen et al. | 14/71.3 |
| 2009/0126130 A1 | 5/2009 | Bettendorf et al. | |

* cited by examiner

LOADING BAY

OBJECT OF THE INVENTION

The present invention refers to a loading bay of the type that is comprised of at least: a fold-away ramp designed to connect the shed and the truck box body, a shelter for closing off the space between the shed and the truck box body at the side and at the top during loading and unloading operations, and light-signalling means to emit light signals as the truck manoeuvres to approach the loading bay.

This loading bay has a series of devices aimed at facilitating manoeuvre of the truck into position, especially in relation to the adequate distance between the trailer and the loading bay, and increasing accessibility and the safety of operators before the doors of the truck are opened and also during the loading and unloading process.

ANTECEDENTS OF THE INVENTION

Among existing antecedents, the unloading bay described in patent application PCT/ES2008/000770 by the holder of the present invention, should be mentioned. It comprises a compact structure fixed to the area around the opening to the shed, and which defines an intermediate space between the internal and external sides of the wall for placing the means of shelter and the fold-away ramp, with the possibility of being moved from an operative position in which they protrude from the aforementioned intermediate space toward the exterior to interact with the truck box body or trailer for loading or unloading, and a inoperative position in which they are arranged in the interior of the intermediate space. This compact structure, in contact with the exterior and interior sides of the wall, comprises frames for setting up an exterior closing door on the exterior level of the shed and an interior door, preferably that can be opened rapidly, which closes on the floor or inferior level of the shed. Other relevant characteristics of the aforementioned invention consist of the incorporation of signalling means controlled by sensors which detect the position of the back of the truck in relation to the loading bay. These signalling means provide visual information on the correct or incorrect position of the truck during its approach to the loading bay.

Another antecedent to be mentioned is patent application PCT ES 2009 000176 by the holder of the present invention, which describes a loading bay that presents construction specificities aimed at enabling its alternative use in different openings in the shed in question, and providing drivers with adequate signalling to facilitate manoeuvring as the truck approaches the opening in which the loading bay is located, or to facilitate manoeuvring when the truck approaches a different opening to the one in which the loading bay is positioned, in order to guarantee that the truck is positioned opposite the loading bay.

Despite improvements made to the loading bays based on the aforementioned documents, there is no record of loading bays that solve certain problems satisfactorily, such as effective signalling that the truck box body or trailer is positioned at an adequate distance for the fold-away ramp to be supported correctly. At present, the truck approaches the bay until it comes into contact with fixed stops, which can lead to the rapid deterioration of these fixed stops and even cause damage to the vehicle. This damage is increased by friction to the truck box body against the aforementioned fixed stops, due to general, continuous changes in height that affect the trailer during loading and unloading movements.

Another disadvantage of known types of loading bay is that, if the truck moves forward during the loading or unloading operation, the fold-away ramp supported on the truck can lose contact with the truck box body and trailer, and suddenly fall uncontrollably, at consequent risk to people or trolleys on the fold-away ramp at that time.

Another disadvantage of the aforementioned type of loading bay is that the back doors of the truck must be opened before the truck approaches the loading bay, as, once the truck is positioned in the loading bay, the fold-down ramp of the loading bay prevents the back doors from being opened.

This disadvantage is considerable when trucks with refrigerator trailers are involved, as, during the time in which the truck is being manoeuvred into position, significant loss of refrigeration occurs, and the ideal conditions for conservation of the load are reduced.

DESCRIPTION OF THE INVENTION

The loading bay, the object of this invention, is of the aforementioned type, comprising at least: a fold-away ramp designed to connect the shed and the truck box body, a shelter that includes at least two fold-away sides and a roof for closing off the space between the shed and the truck box body at the side and at the top during loading and unloading, along with light signalling means to emit light signals as the truck manoeuvres towards the loading bay. As a result, the loading bay presents construction specificities aimed at facilitating the manoeuvre of the truck towards the loading bay, especially in relation to the adequate distance between the trailer and the loading bay, and to increase accessibility and the safety of operators before the doors of the truck are opened and also during loading and unloading.

As a result, in accordance with the intervention, this loading bay comprises the following elements:
- a fold-away platform, located on a lower level to the fold-away ramp,
- actuating means for the fold-away platform, from a vertical, inward-facing, inoperative position in relation to the fold-away sides of the shelter, and an operative position that is horizontal and protrudes in relation to the opening of the loading bay,
- front stops set on the front end of the fold-away platform with the possibility of being moved longitudinally and forming means with which the trailer or truck box body can come into contact during its approach to the loading bay,
- means to detect the position of the front stops that activate the light-signally means and cause different light signals depending on the displacement of the front stops by the truck box body during its approach to the loading bay,
- longitudinal displacement means for the front stops to distance them from the truck box body located in the loading bay.

With these elements, when the truck reaches the adequate position in relation to the loading bay, it comes into contact with the front stops, causing the means to detect the position of the front stops to activate the light-signalling means and emit a first signal that contact has been made, for example in green.

If the truck continues to move, causing the front stops to move further backwards, the means to detect this will cause the signalling means to emit consecutive signals, for example in yellow and red, consecutively, letting the driver know that it is necessary to stop.

When the truck is stationary in the position indicated by the signalling means, the front stops are distanced from the truck box body by the longitudinal displacement means associated to these front stops, so that during loading and unloading, contact is not maintained with the truck's box body, preventing damage to the stops or to the truck due to the vertical movements that occur during loading and unloading.

In this operative position, the fold-away platform creates an adequate surface area for the operator to access and open the back doors of the truck comfortably and safely.

This fold-away platform provides other advantages, as it limits the fall of the fold-away ramp if the truck moves during the loading and unloading process, and the fold-away ramp loses contact with the truck box body.

In a setup of the invention, the fold-away ramp is associated to guide means that allow side displacement, when it is in the upper, inoperative position, to an extreme position in which at least part of the opening in the loading bay remains free, enabling access from inside the shed to the fold-away platform. These guide means can be formed by any device, actuated manually, electrically, mechanically or hydraulically, to enable the side displacement of the fold-away ramp when it is raised in a inoperative position.

This side displacement of the fold-away ramp enables the operator to open the back doors of the truck once it is positioned in the loading bay, and, therefore, within the shelter. This reduces the loss of refrigeration in the case of refrigerator trucks, as occurred in previously known types of loading bay, for which it was essential to open the back doors before manoeuvring the truck into position towards the loading bay.

In a setup of the invention, the fold-away platform comprises at least one moveable element to fasten and hold the truck in place in the loading bay.

This moveable element can present multiple configurations, having been designed in one setup example as a fold-away fastening device that acts on the back of the truck, connecting it to the fold-away platform and preventing it moving forward during loading and unloading.

In accordance with one setup of the invention, the sides of the shelter are set on vertical axes with the possibility of folding from a closed position in which they are both coplanar, and an open position in which they form an angle greater than 90° to the closed position. This open angle allows the sides of the shelter to adjust to the sides of the truck once the truck is positioned in the bay, and, even if the truck is not centrally aligned in the loading bay. This prevents the sides being knocked during the manoeuvre to bring the truck towards the opening of the loading bay.

In a setup example of the invention, the edges of the sides of the shelter have flexible door strips that connect the sides to the truck box body, preventing damage to the truck and forming a sealing them when they come into contact. These door strips can provide an electrical signal when they make contact.

In a setup of the invention, on one of its lower parts of the roof of the shelter, a flexible sheet edge seals the truck box body when it is in position for loading/unloading, and the loading bay is operative with the doors of the shelter overlapping the sides of the truck box body.

In accordance with the invention, a mobile, manual or automatic mechanism protrudes from the sides of the shelter, which blocks the doors of the truck to prevent them accidentally closing during loading/unloading, and unblocks them once the loading/unloading process is complete so that they can be closed.

DESCRIPTION OF FIGURES

To complete the description and facilitate understanding of the different features of the invention, the present descriptive report includes a not of illustrative but not limiting figures in which the following can be seen.

PREFERRED SETUP OF THE INVENTION

Figure 2:
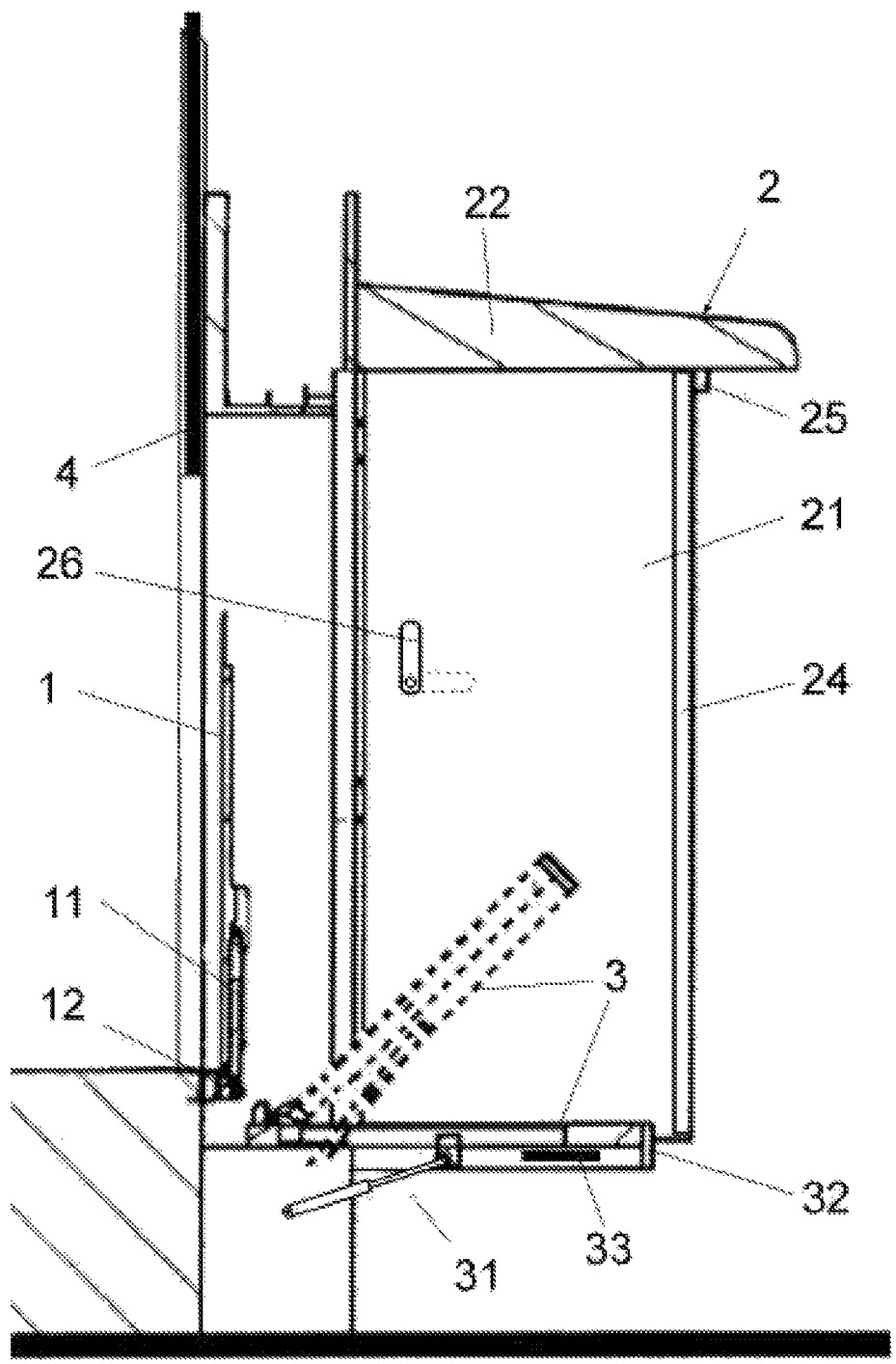
FIG. 2 shows a vertical cross-section of the loading bay, with the fold-away ramp in a raised position, as the fold-away platform is lowered.
Figure 4:
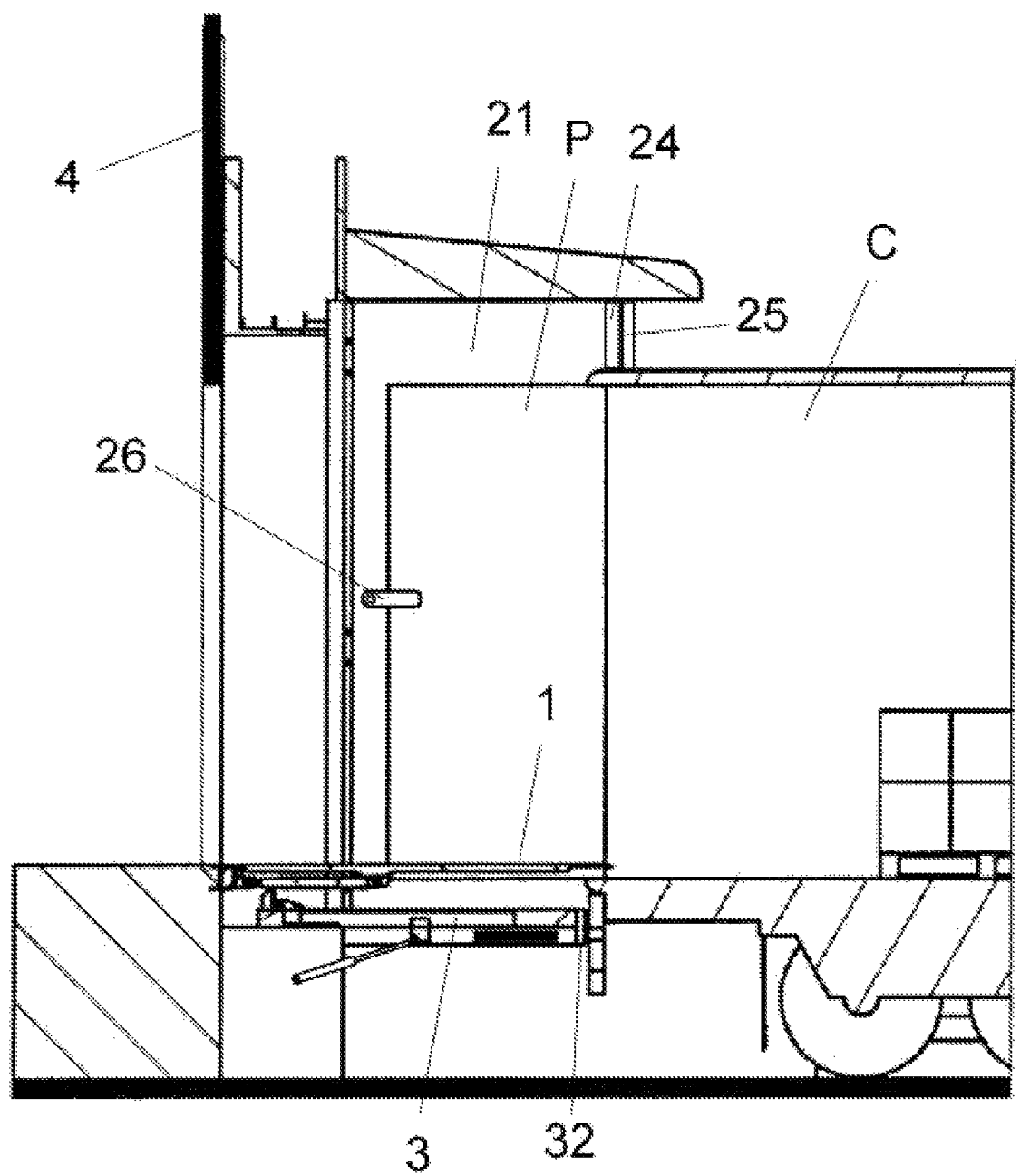
FIG. 4 shows a vertical cross-section of the loading bay, in an operative position with the fold-away ramp supported against the truck box body located in the loading bay.
Figure 5:
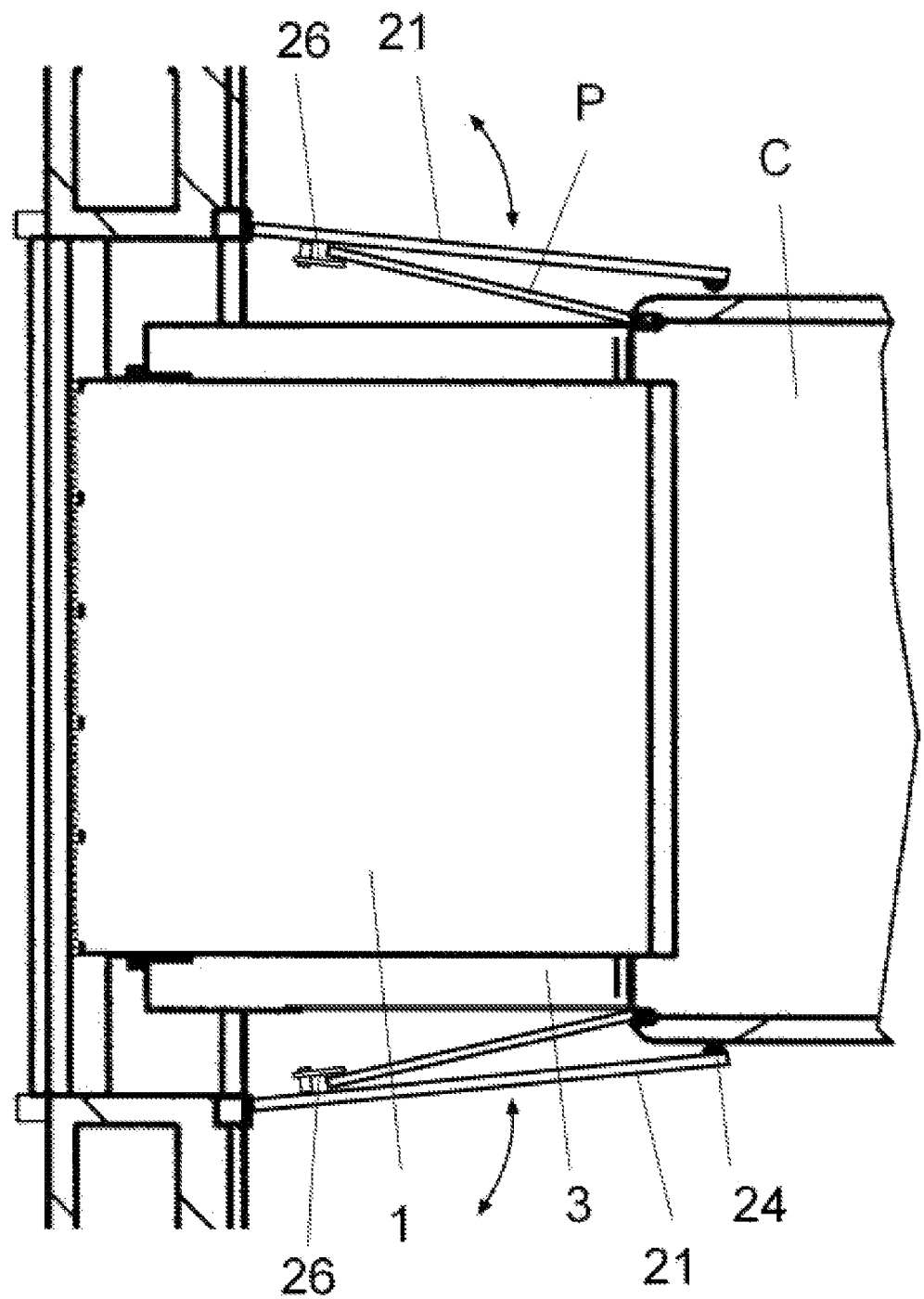
FIG. 5 shows a horizontal cross-section of the loading bay in the same position as the previous figure.

In the setup example shown in the figures attached, the loading bay comprises a fold-away ramp (1) actuated by means of a hydraulic cylinder (11), from a inoperative raised position, shown in FIG. 2 and an operative position shown in FIGS. 4 and 5, supported against the truck box body (C), once the back doors (P) of the truck are open, connecting them for the loading and unloading of goods.

Figure 1:
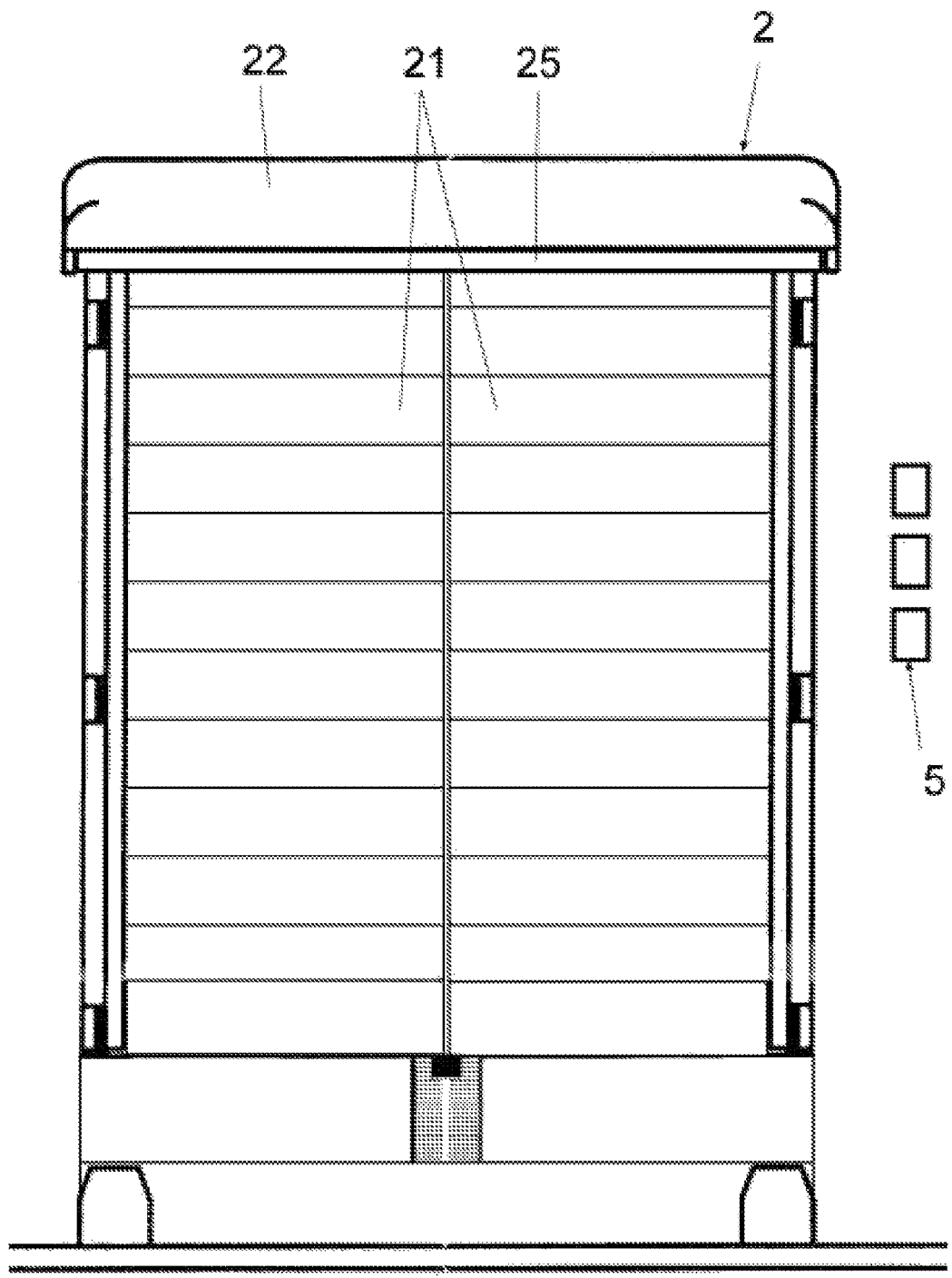
FIG. 1 shows a cross-section of the front from above of a setup example for the loading bay in a closed position.

On the exterior side of the loading bay, there is a shelter (2) formed by a roof (22) and two fold-away sides (21), from a closed position shown in FIG. 1 to an open position shown in FIG. 2.

The loading bay comprises, in accordance with the invention, a fold-away platform (3) located below the fold-away ramp (1) and actuated by means of hydraulic cylinders (31), from a inoperative vertical position, and a horizontal operative position.

In the inoperative position of the loading bay, the fold-away ramp (1) and the fold-away platform (3) are vertical and parallel, positioned between the closure created by the sides (21) of the shelter and an internal door (4), with a vertical opening in this case.

Figure 3:
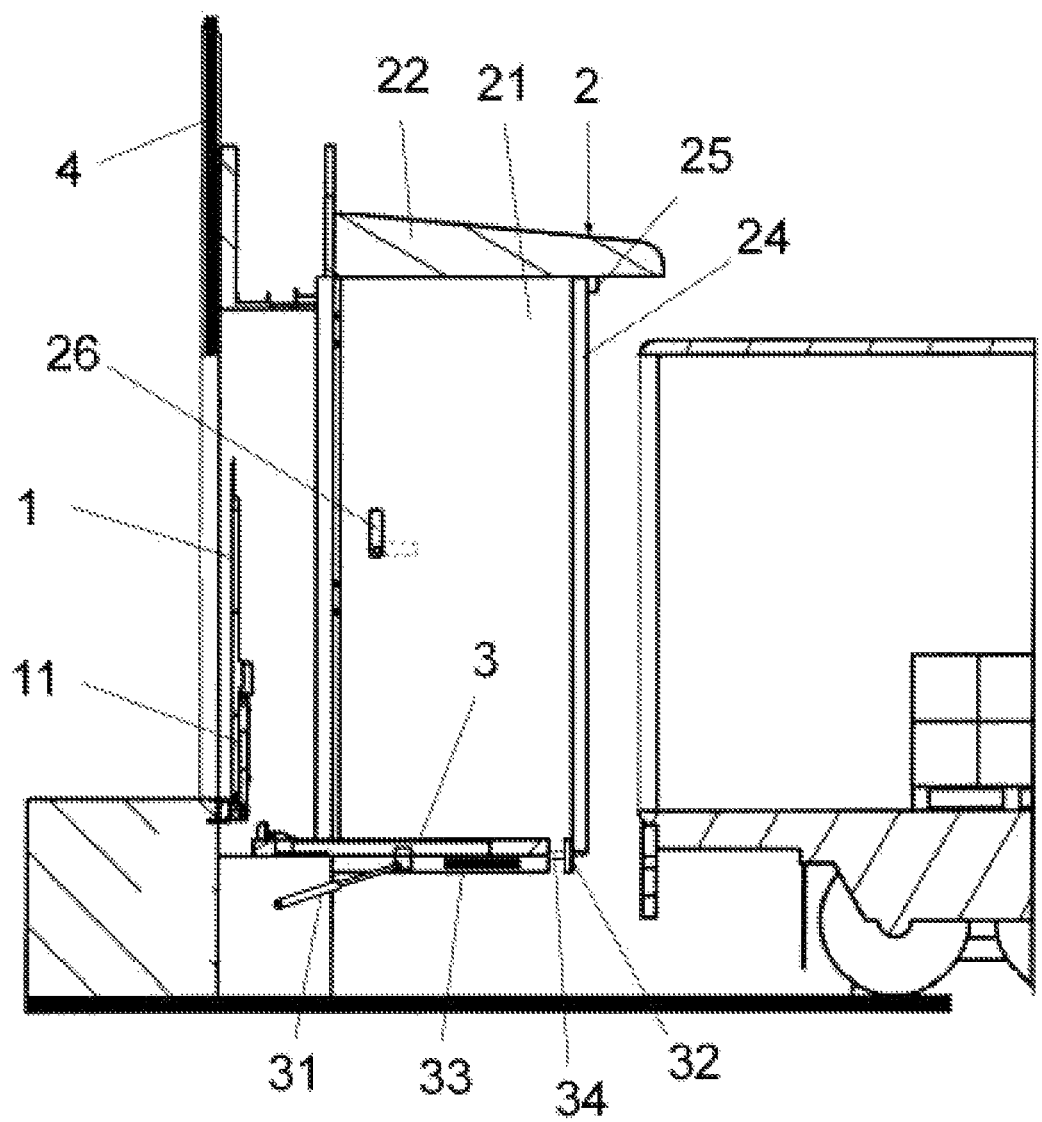
FIG. 3 shows a vertical cross-section of the loading bay, with the fold-away ramp in the lower position, as the truck approaches, and the front stops of the fold-away platform can be observed in a protruding position.

On the front end of the fold-away platform (3) are set front stops (32) able to move longitudinally and which, in an initially protruding position, shown in FIG. 3, form a means with which the truck box body (C) can come into contact as it approaches the loading bay.

The loading bay comprises means to detect (33) the position of the front stops (32), which activate light-signalling means (5), causing different light signals to be emitted as the front stops are moved backwards due to the pushing action from the truck box body (C) as it approaches the loading bay.

These signals can be a green light, for example, activated by sensors (33) on initial contact of the truck with the front stops (32), a yellow light activated by sensors (33) when the front stops (32) have moved back halfway, and a red light activated when the front stops (32) reach a certain backwards position.

The aforementioned front stops (32) are associated to longitudinal displacement means (34), associated to the fold-away platform (3), which can be partially observed in FIG. 3, formed in a setup example by one or more hydraulic cylinders that cause additional backward movement and distance the front stops (32) from the truck box body (C), once the truck is located in the loading bay.

This distancing prevents the front stops (32) from coming into contact with the truck box body (C), during loading and unloading.

The fold-away ramp (1) is associated to guide means (12) for side displacement through the interior of the opening of the loading bay.

Figure 6:
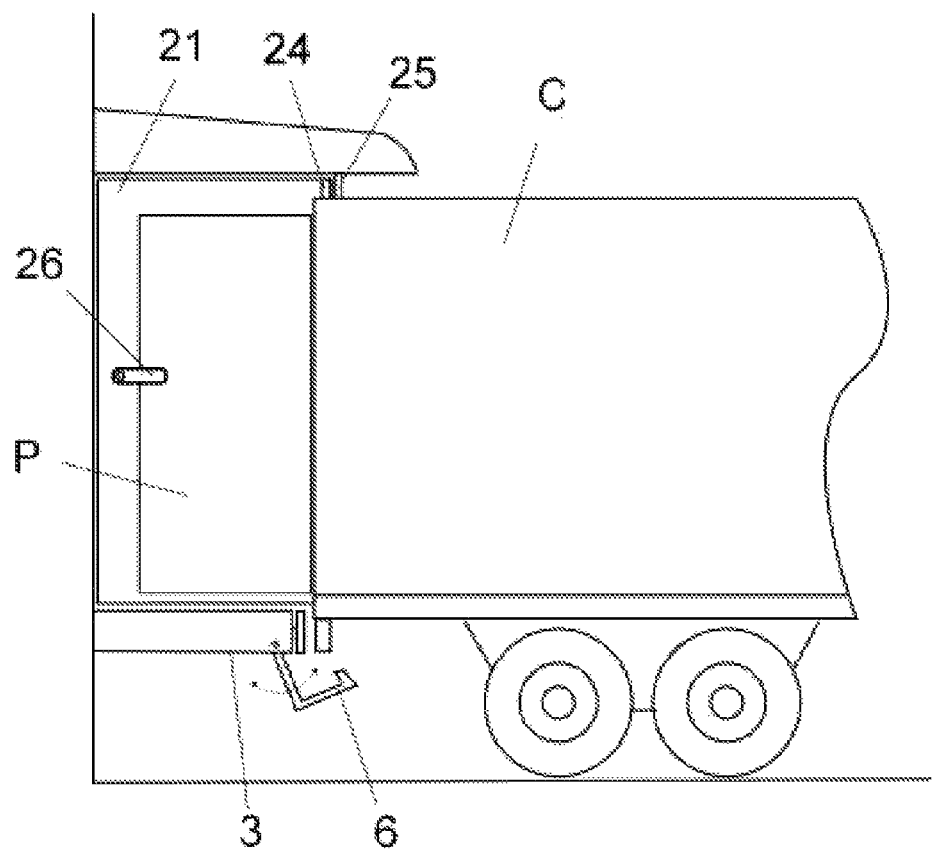
FIG. 6 shows a setup example schematically for the moveable element of the fold-away platform to fasten and hold the truck in place in the loading bay during loading and unloading.

In the setup example shown in FIG. 6, the fold-away platform (3) has a moveable element (6); a fold-away fastening device in this case, to fasten and hold the truck positioned in the loading bay, in order to prevent it moving during loading and unloading.

Figure 7:
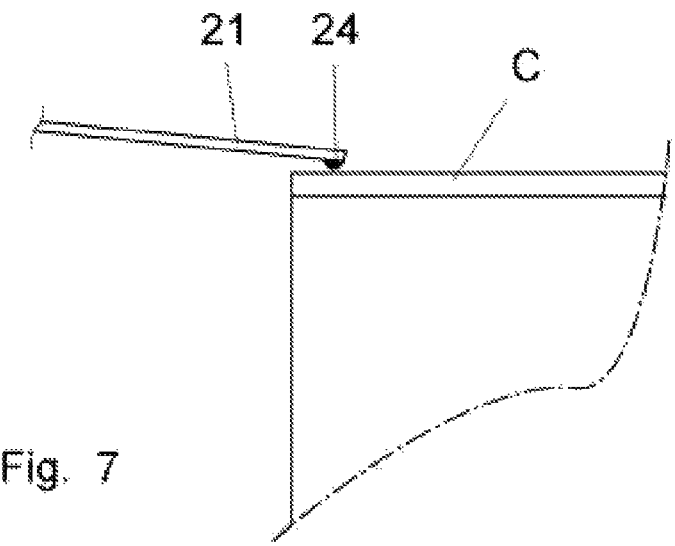
FIG. 7 shows a cross-section in detail of the end of one of the fold-away sides of the shelter in which the flexible door strip is shown in a closed position against the truck box body when the system is in an operative position.

In the setup example shown in FIG. 7, the fold-away side of the shelter (21) has a flexible door strip (24) at the end that enables contact between the side of the outside of the truck box body (C), adjusting to it without causing damage or scratching, and leading to greater sealing of the equipment, signalling the close and correct sealing of the equipment ready for use.

In the setup example shown in FIG. 4, the roof of the shelter (22) has a flexible sheet edge of appropriate thickness (25). It moves vertically to seal the roof of the truck box body correctly once it is positioned in the loading/unloading position, and the doors of the shelter (21) are placed in the operative closed position on the sides of the truck.

In the setup example shown in FIG. 5, the sides of the shelter (21) have a mobile mechanism (26) that enables the position for loading/unloading of the truck to block the doors to prevent them closing accidentally, allowing its mobility once it is unblocked.

Finally, it should be highlighted that the sides (21) of the shelter are set on vertical axes with the possibility of folding from a closed position, shown in FIG. 1, in which they are arranged in a coplanar way, and a position of maximum opening in which they form an angle greater than 90° to the closed position, making it possible to adjust to the sides of the truck, even if the truck is not centrally aligned with the loading bay.

Having described in sufficient detail the nature of the invention, and provided an example of preferential use, it is stated for relevant purposes that the materials, shape, size and arrangement of the elements described can be modified, as long as they do not suppose an alteration of the essential features of the invention which are outlined below.

The invention claimed is:
1. A loading bay comprising:
a fold-away ramp designed to connect a shed and a truck box body of a truck,
a shelter with at least two fold-away sides and a roof for closing off a space between the shed and the truck box body at a side and at a top during loading or unloading operations, along with light-signaling devices to emit different light signals as the truck maneuvers to approach the loading bay,
a fold-away platform, located on a lower level relative to the fold-away ramp, that can support a person to open doors of the truck once the truck is in place for loading and unloading,
actuating means for the fold-away platform from an inoperative vertical position, inward-facing, in relation to the at least two fold-away sides of the shelter, and an operative, horizontal position that protrudes in relation to an opening of the loading bay,
front stops disposed on a front edge of the fold-away platform, wherein the front stops are configured to move longitudinally in a direction away from and towards the front edge of the fold-away platform, the front stops being configured to contact a trailer or the truck box body during an approach to the loading bay,
means to detect the position of the front stops relative to the loading bay, which activate the light-signaling devices and cause the emission of the different light signals depending on a degree of rearward displacement of the front stops by the truck box body or trailer during the approach to the loading bay, and
longitudinal displacement means for the front stops to distance the front stops from the truck box body or trailer once the truck is in a stationary position in the loading bay so that during loading and unloading operations, the front stops are free of contact with the truck box body or trailer.

2. Loading bay, according to claim 1, wherein the fold-away ramp includes a guide means for displacing the fold-away ramp laterally, in the inoperative vertical position, towards an extreme lateral position in which at least part of the opening of the loading bay remains free, enabling access from inside the shed to the fold-away platform.

3. Loading bay, according to claim 1, wherein the fold-away platform comprises at least one moveable element to fasten and hold the truck positioned in the loading bay.

4. Loading bay, according to claim 1, wherein the at least two fold-away sides of the shelter are set on vertical axes with the capability of folding from a closed position in which the at least two fold-away sides of the shelter are arranged in a coplanar way, and a position of maximum opening in which the at least two fold-away sides of the shelter form an angle greater than 90° to the closed position.

5. Loading bay, according to claim 1, wherein the at least two fold-away sides of the shelter allow the opening and the truck box body to be sealed once the truck is positioned for loading and unloading.

6. Loading bay, according to claim 1, wherein edges of the at least two fold-away sides of the shelter have flexible door strips that connect the at least two fold-away sides to the truck box body, preventing damage to the truck and causing the flexible door strips and the truck to be sealed together when the flexible door strips and the truck come into contact, wherein the flexible door strips are configured to provide an electric signal on contact.

7. Loading bay, according to claim 1, wherein from the roof of the shelter, on one of the roof's lower parts, a flexible sheet edge protrudes that enables the truck box body to be sealed when the truck is in position for loading and unloading, and the loading bay is open to the truck box body with the at least two fold-away sides of the shelter overlapping sides of the truck box body.

8. Loading bay, according to claim 1, wherein from the at least two fold-away sides of the shelter, a mechanism protrudes that enables doors of the truck to be blocked to prevent the doors from closing accidentally during loading and unloading, and which is unblocked once the loading and unloading process has finished so that the doors can be closed.

9. Loading bay, according to claim 1, wherein the means to detect the position of the front stops is configured such that when an initial contact is detected between the truck body body or trailer, the means to detect the position of the front stops instructs the light-signaling devices to emit a first light signal and whereupon as the front stops are moved longitudinally in a rearward direction, the means to detect the position of the front stops instructs the light-signaling devices to emit one more light signals that are different than the first light signal and are based on the degree of longitudinal displacement of the front stops in the rearward direction toward the loading bay.

10. Loading bay, according to claim 9, wherein the first light signal is a green light and the one or more light signals comprises a yellow signal indicating that the fronts stops have been displaced a first distance in the rearward direction from a first position at which the initial contact is detected and a red signal indicating that the front stops have been displaced a second distance in the rearward direction from the first position at which the initial contact is detected.

11. Loading bay, according to claim 10, wherein the first distance is a distance in which the front stops have moved back halfway between the first position and a backwards position of the front stops, wherein the second distance is a distance in which the front stops are at the backward position.

12. Loading bay, according to claim 1, wherein the front stops are configured such that a front face thereof contacts the truck box body or trailer.

13. Loading bay, according to claim 1, wherein during loading and unloading operations, the fold-away platform is disposed generally horizontal to the ground to allow the longitudinal displacement means to move the front stops in forward and rearward directions along an axis that is horizontal to the ground.

* * * * *